United States Patent [19]
Furseth et al.

[11] Patent Number: 5,547,342
[45] Date of Patent: Aug. 20, 1996

[54] INSERTABLE STATOR VANE ASSEMBLY

[75] Inventors: John P. Furseth, Chandler; Frank Heydrich, Phoenix; Forest H. Hover, Chandler; Ian Little, Phoenix; Steven G. Mackin, Chandler Heights; Steven C. Stenard; James L. Thompson, both of Scottsdale; Ellen White, Tempe; Bruce D. Wilson, Gilbert, all of Ariz.

[73] Assignee: AlliedSignal Inc., Morris Township, N.J.

[21] Appl. No.: 474,270

[22] Filed: Jun. 7, 1995

Related U.S. Application Data

[62] Division of Ser. No. 173,318, Dec. 22, 1993, Pat. No. 5,494,404.
[51] Int. Cl.$^6$ ........................................................ F04D 5/00
[52] U.S. Cl. ...................... 415/200; 416/230; 416/241 A
[58] Field of Search ............................... 415/189, 209.2, 415/209.3, 209.4, 200; 416/229 R, 229 A, 230, 241 A

[56] References Cited

U.S. PATENT DOCUMENTS

| 3,883,267 | 5/1975 | Baudier et al. | 416/230 |
| 5,221,188 | 6/1993 | Schlosser | 416/230 |
| 5,269,659 | 12/1993 | Garfinkle | 416/230 |
| 5,308,228 | 5/1994 | Benoit et al. | 416/230 |
| 5,378,110 | 1/1995 | Ress, Jr. | 416/230 |
| 5,380,152 | 1/1995 | Sikorski et al. | 415/200 |

Primary Examiner—John T. Kwon
Attorney, Agent, or Firm—James W. McFarland

[57] ABSTRACT

A composite stator vane for a gas turbine engine comprising a plurality of compression molded, heat cured plies, the plies including a plurality of centrally located internal plies of reinforcement material of unidirectional yarns of para-aramid fibers, a plurality of plies of resin impregnated graphite fiber material on each side of the centrally located plies of reinforcement material, and an external steel wire mesh ply on the leading edge of the vane.

8 Claims, 3 Drawing Sheets

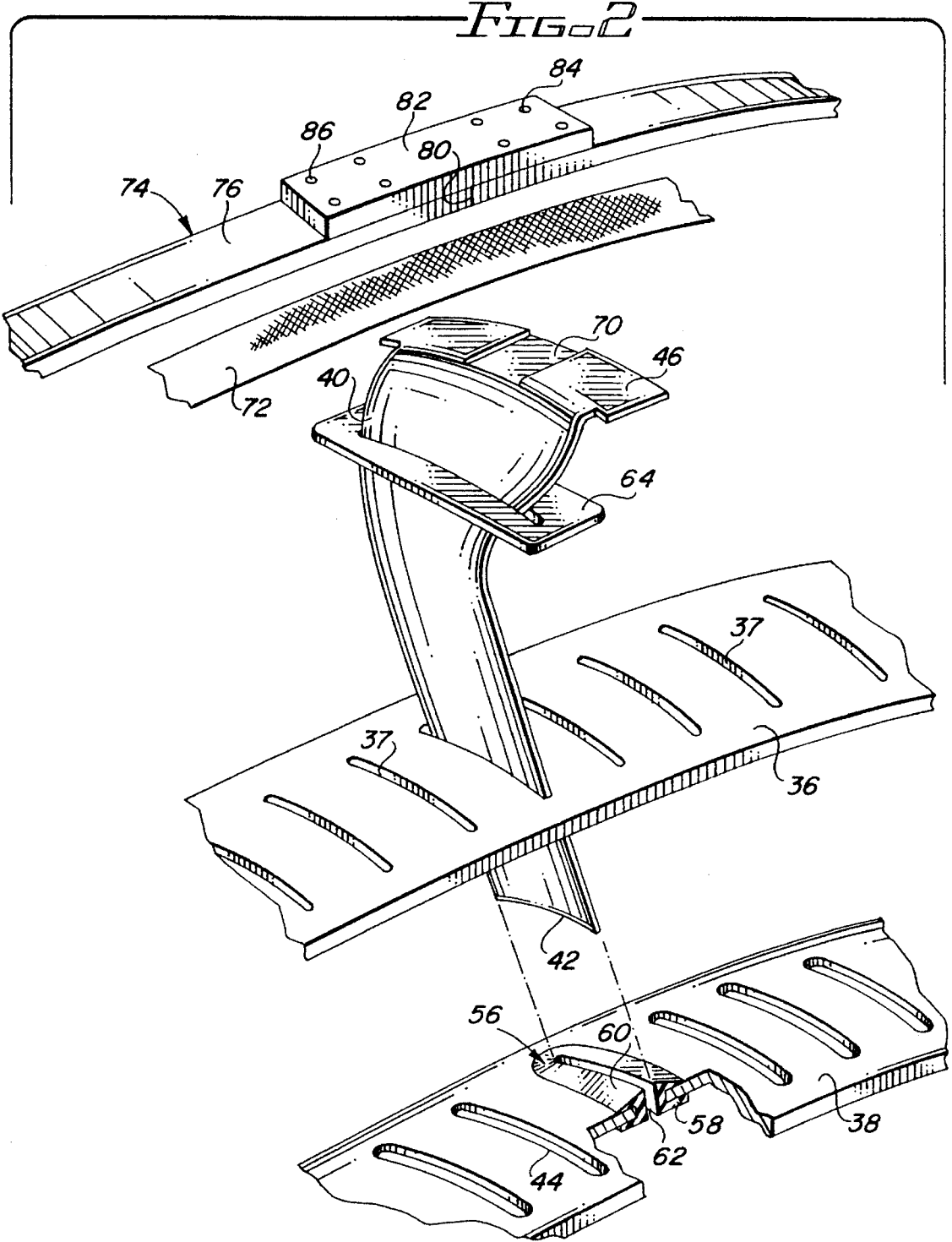

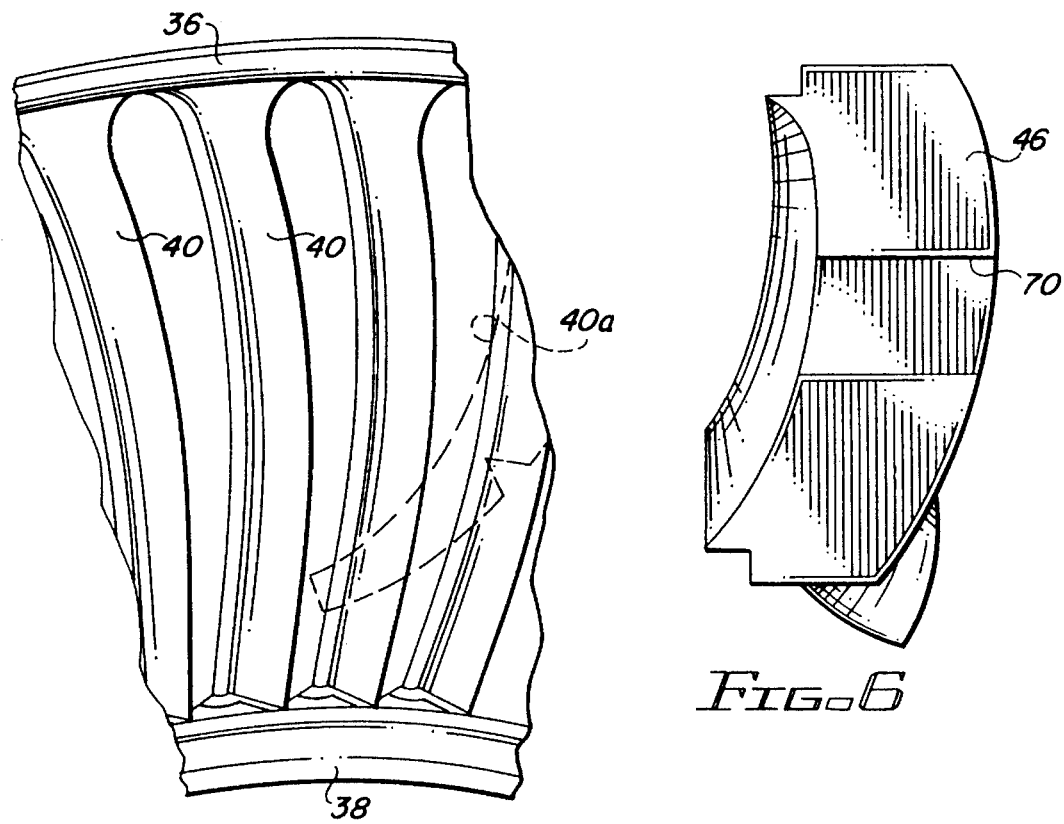
FIG. 11
FIG. 6
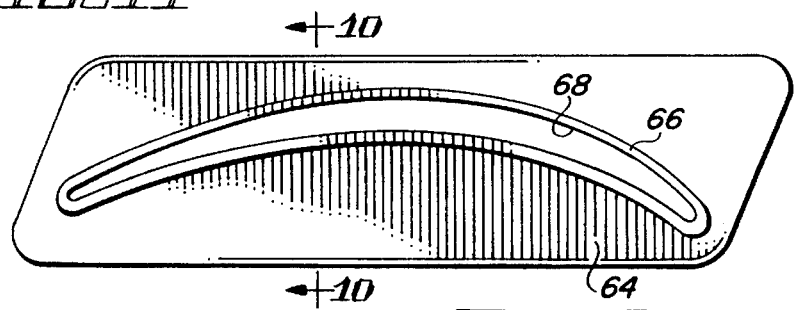
FIG. 9
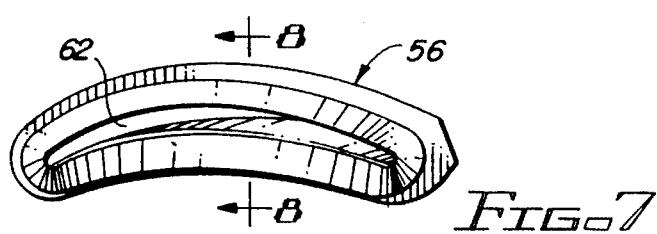
FIG. 7
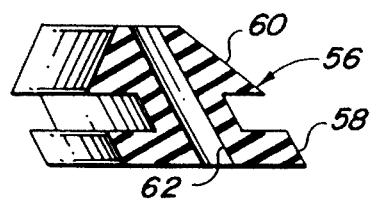
FIG. 8
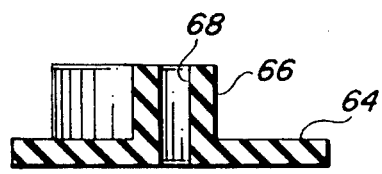
FIG. 10

INSERTABLE STATOR VANE ASSEMBLY

This is a division of application Ser. No. 08/173,318, filed Dec. 22, 1993, now U.S. Pat. No. 5,494,404.

The prior application was assigned to Allied-Signal Inc. by virtue of Assignments recorded in the U.S. Patent Office on Dec. 22, 1993 and Feb. 22, 1994, in Reels 6929, Frame 0044/0047.

TECHNICAL FIELD

This invention relates to gas turbine engines, and relates more particularly to a stator vane apparatus and assembly method for use in such a gas turbine engine.

BACKGROUND OF THE INVENTION

Turbofan gas turbine engines include a forwardly located, high speed rotary fan which receives, compresses, and discharges the primary air flow of the gas turbine engine to produce power, either in the form of thrust for an aircraft or to produce rotary mechanical power. Disposed immediately downstream of the fan is a fan stator assembly comprising a plurality of stator vanes spanning the duct carrying the compressed air flow from the fan. The stator vanes operate to redirect the direction and amount of swirl imparted to the compressed air such that it is in proper swirl orientation for the next stage of engine operation and/or to straighten bypass airflow. Normally the following stage is the first stage of a high pressure compressor. It is important that the mass of such a stator vane assembly be minimized to minimize overall weight of the engine, yet be tolerant of foreign object damage which may occur when foreign objects are carried through the fan in the inlet air flow.

Typically, the complexity of such a fan stator assembly requires very lengthy assembly time due to the number of components. For example, sixty to eighty stator vanes are not uncommon for such a fan stator assembly. Complexity and the length of time for assembly directly contributes to the overall cost of the engine. Repair and overhaul of typical stator assemblies cannot be accomplished except at the site of original manufacture.

SUMMARY OF THE INVENTION

It is an important object of the present invention to provide an improved stator vane assembly structure, and method of assembling, which dramatically reduces overall assembly time by utilizing stator vanes that are readily insertable radially through the outer shroud and into the inner hub.

Another important object of the present invention is to provide an improved stator vane assembly of the type described which, by virtue of its assembly techniques, does not rigidly intersecure the inner radial tip end of the stator vanes to the hub, to provide a controlled, predictable vane failure in the event of foreign object damage to prevent further damage to the engine and to allow continued operation thereof.

Another important object of the present invention is to provide an improved stator vane assembly of the type referred to wherein the stator vane is of a light weight, composite, nonmetallic material resistant to erosion, and subject to a controlled, predictable failure in the event of foreign object damage.

These and other objects and advantages of the present invention are specifically set forth in, or will become apparent from the following detailed description of a preferred embodiment of the invention, when read in conjunction with the accompanying drawings.

BRIEF DESCRIPTION OF THE DRAWINGS

FIG. 2 is an exploded perspective view of partially assembled elements of the fan stator assembly of the present invention, with portions broken away to reveal internal details of construction;

FIG. 3 is a partial plan cross sectional view of a typical stator vane, as viewed along lines 3—3 of FIG. 1;

FIG. 6 is a top plan view of the foot portion of a stator vane as viewed along lines 6—6 of FIG. 1;

FIG. 7 is a top plan view of the hub grommet;

FIG. 8 is an elevational cross sectional view taken along lines 8—8 of FIG. 7;

FIG. 9 is a top plan view of the outer grommet seal;

FIG. 10 is an elevational cross sectional view taken along lines 10—10 of FIG. 9; and FIG. 11 is a partial front elevational view of a portion of the stator vane assembly, with a failed vane illustrated in dotted lines.

DETAILED DESCRIPTION OF THE PREFERRED EMBODIMENT

Figure 1:
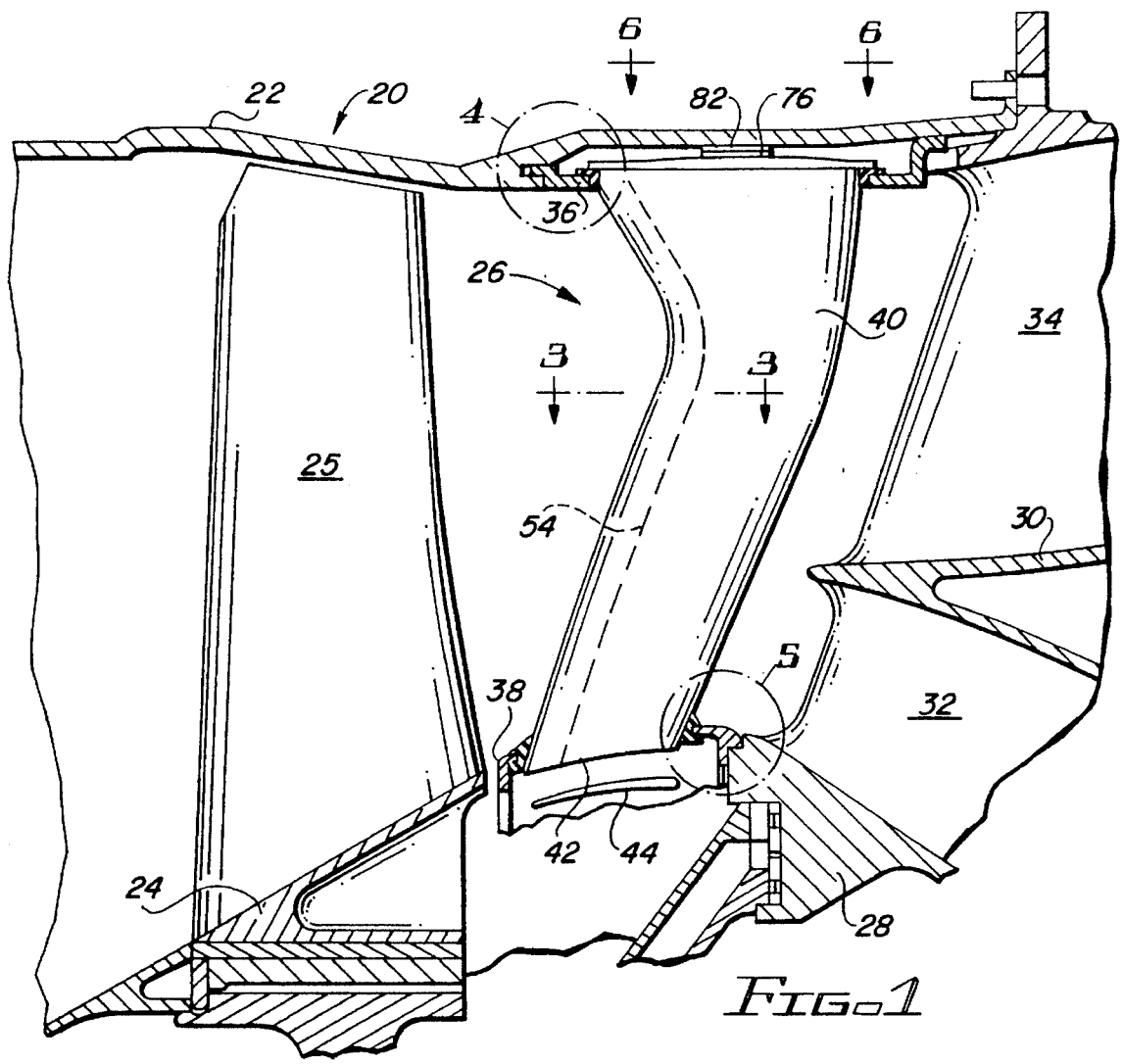
FIG. 1 is a partial side elevational, cross sectional view of a portion of a gas turbine engine incorporating the present invention.
Figure 4:
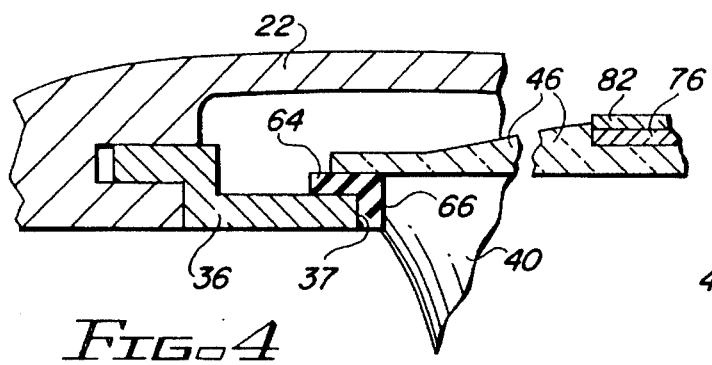
FIG. 4 is an enlarged partial elevational cross sectional view of the area denoted by lines 4—4 of FIG. 1.

Referring now more particularly to the drawings, a turbofan gas turbine engine generally referred to by the reference numeral 20 includes an outer casing 22, a rotary front fan 24, and a stator vane assembly 26 disposed immediately downstream of the blades 25 of the fan 24. The stator vane assembly is secured to the outer casing 22 in stationary relationship, and is also affixed to internal stationary support structure 28 of the engine. Downstream of the stator vane assembly 26, the compressed air flow may be split by a divider 30 into a core air flow passage 32 leading to the compressor stages of the gas turbine engine, and a bypass duct 34 wherein air flow may be exhausted out the rear of the engine.

As best depicted in FIGS. 1, 2, 6 and 11, the stator vane assembly 26 includes an annular or circular outer shroud 36 having opposed axial ends secured by conventional structure to casing 22. Additionally, the stator vane assembly 26 has an annular, metallic inner hub 38 secured to support structure 28. Spanning the radial space between shroud 36 and hub 38 are a plurality of stator vanes 40 having a radially inner tip end 42 extending through openings 44 in hub 38, and an opposite outer end of each of the vanes 40 is formed with an integral foot 46 located outwardly of the outer surface of shroud 36. Shroud 36 has similar openings 37 therein through which the aerodynamically contoured portion of the vanes 40 may be inserted, as described in greater detail below.

As illustrated in FIG. 3, the stator vane 40 is preferably comprised of a nonmetallic, composite material consisting of a plurality of compression molded, heat cured plies. The plies include up to seven centrally located plies of reinforcement material such as a unidirectional yarn of para-aramid fiber, such as Kevlar (a trademark of E. I. DuPont Demours & Company). The plies of para-aramid fibers 48 are nonwoven with the orientation of the inner directional yarns thereof substantially in alignment with the longitudinal, longest, axis of the vane 40. On each side of the centrally located plies of para-aramid fibers are a plurality of plies of resin impregnated graphite fiber material 50 and 52. These plies 50 are also nonwoven, unidirectional and divided in to two sets of plies. The first set of plies 50 of the graphite fibers are oriented at an acute angle of approximately 22 degrees to the orientation of the centrally located fibers 48. The outer set of plies 52 have an orientation of approximately 55 degrees relative to the orientation of the centrally located fibers 48. The set 50 comprises at least two plies of such graphite fibers, and the set 52 on each side of the centrally located fibers 48 also comprises at least two plies of the graphite fiber material. Acceptable graphite material is available from Hexcel Corp., Dublin, Calif. A ply of woven steel wire mesh material 54 is placed on the external surface of the vane 40 in covering relationship to the leading edge thereof. All of the plies 48, 50, 52 and 54 are compression molded and heat cured in the same operation. The result is a strong, light weight composite material for vane 40.

Figure 5:
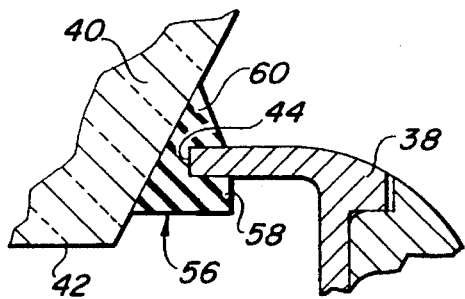
FIG. 5 is a view similar to FIG. 4 but showing the area denoted by lines 5—5 of FIG. 1.

The stator vane assembly 26 further includes an inner seal in the form of a hub grommet 56 illustrated in detail in FIGS. 5, 7 and 8. Grommet seal 56 is comprised of a flexible thermoelastic ether-ester elastomer, (such as "HYTREL" available from DuPont referenced above) material and has radially inner and outer lips 58, 60 overlying the inner and outer surfaces of hub 38 and extending through each of the openings 44. Grommet 56 has a central opening 62 closely configured to the inner tip 42 of the vane 40 for snugly, sealingly and receiving the same. It is important to note that vane 40 is radially restrained to hub 38 solely by frictional engagement with, and compression of grommet 56.

Disposed between the foot 46 of vane 40 and the outer surface of outer shroud 36 is a shroud grommet 64, also of flexible thermoelastic ether-ester elastomer material, disposed on the exterior surface of shroud 36 between it and the foot 46 of vane 40. Grommet 64 overlies a portion of the outer surface of shroud 36 to sealingly engage the latter, and also includes a radially inwardly extending lip 66 which closely surrounds and sealingly contacts the radially outermost portion of the air foil section of the vane 40. Grommet 64 also has an opening 68 therein through which the aerodynamic portion of the vane extends.

Foot 46 of each vane 40 extends radially and circumferentially therefrom, and includes a circumferentially extending central groove 70 therein. Disposed within groove 70 is a layer of protective tape 72 such as 3M type 25 tape, and a circular, annular band of metallic material 74 that extends around the entire circumference of the stator vane assembly 26. As described in greater detail below, the band 74 includes a strap 76 configured into a circular arrangement with opposing ends 80 thereof in approximately abutting engagement, and an overlying strip of metallic material 82 which is blind riveted at 84 and 86 to the opposed ends 80 of the strap 76 to hold the same in circular configuration, for purposes as described in greater below.

The fan stator assembly 26 may be conveniently and rapidly assembled in the following manner. First, the inner and outer shrouds 36, 38 are disposed in an assembly fixture (not shown) in the appropriate relative axial, concentric arrangement to one another, and circumferentially clocked with the associated openings 37, 44 thereof aligned radially. A stator vane 40 is assembled in the following manner. First, hub grommet 56 is mounted onto the hub 36 with the inner and outer lips thereof in surrounding, overlying relationship to the opening 44 therein. Also, the shroud grommet 64 is slipped loosely onto the stator vane 40 and pushed to a location somewhat adjacent the outer foot 46 thereof. The inner end 42 of the vane 40 is then inserted radially inwardly through opening 37 in outer shroud 36. FIG. 2 illustrates this partially assembled state. Then end 42 is pushed further radially inwardly through the opening 62 in the hub grommet 58 such that the inner tip end 42 of the vane extends slightly radially inwardly of the grommet 56. In this position of vane 40 the major radially and circumferentially extending sealing surface of grommet 64 is in abutting engagement with the radial inner surface of foot 46.

Each stator vane is sequentially inserted through the associated openings 37, 44 in the manner described above, until all stator vanes 40, grommets 56, and grommets 64 are in position. An assembly clamping tool (not shown) is then brought into engagement with the radial outer surfaces of the foot 70 of all the stator vanes 40. In this disposition the adjacent foot of each stator vane has the grooves 70 thereof aligned with one another to present a full circular, circumferential groove extending around the outer circumference of the assembly. Preferably, the clamping mechanisms may be disposed on opposite sides of the grooves 70 and extend circumferentially around the entire assembly. The clamping mechanism is then actuated to exert a uniform, radially inwardly directed, clamping force on the entire assembly. A clamping force of approximately 200 psi has been found adequate. Various types of assembly clamping mechanisms could be utilized. For example adjustable diameter circular bands could be placed around the assembly, then reduced in diameter to create the radial inward clamping force on the assembly.

Protective tape 72 is then positioned in the bottom of the aligned grooves 70, and band 74 is then placed upon the tape 72, positioned within the aligned grooves 70. Band 74 extends around the entire circumference of the assembly. The opposed ends of the strap 76 are brought adjacent one another, snugly lying within the aligned grooves 70. Strip 82 now overlies the opposed ends 80 of the strap 76, and blind rivets 84, 86 are installed from the radial outer direction to firmly intersecure the opposed ends of the strap 76. If desired, one end of the strip 82 may be pre-secured to one end of the strap 76 through blind rivets 84, requiting only the installation of the other set of blind rivets 86 to complete the securement of band 74 in to the aligned grooves 70.

Once the opposed ends 80 of strap 76 are so intersecured by installation of strip 82, band 74 is now holding the assembly with the radial inward clamping force still applied. The temporary assembly clamping mechanism may then be removed, and the radial inward clamping force on the assembly is still retained by virtue of band 74. In such position, outer grommet 64 is in adequate sealing interengagement with foot 70 and shroud 36 to preclude air leakage through the openings 37 in shroud 36. Similarly, vane 40 is in frictional, sealing interengagement with the walls of opening 62 in hub grommet 56, also pressing grommet 56 into sealing interengagement with hub 38. As a result, hub grommet 56 effectively precludes air leakage through the openings 44 in hub 38.

It is important to note that the inner tip end 42 of the vane 40 is not rigidly intersecured upon hub 38. Rather, each of the vanes 40 is radially held in place in the hub 38 solely by the frictional interengagement of the vane 40 with the grommet 56. It will now be clear that this radial nonsecurement of the vanes 40 to the hub 38 allows and facilitates the simplified, convenient, and rapid assembly of the entire stator vane assembly 26.

During operation of the gas turbine engine, foreign objects may be ingested through the inlet of the engine, passing by the primary fan blades 25 and impacting upon one or more of the vanes 40 of stator vane assembly 26. In aerospace applications, such gas turbine engines must be able to withstand foreign object damage up to a certain size, and the engine must continue to operate, perhaps on a reduced efficiency basis, for a predetermined period of time for safety of the aircraft.

The stator vane assembly 26 of the present invention facilitates safety and operation of the engine in the event of ingestion of foreign objects, by virtue of the structure and configuration of the stator vane assembly 26 as set forth previously. More particularly, a typical failure as may be expected to occur due to foreign object damage impact is illustrated in dashed lines in FIG. 11. Here, a stator vane 40*a* has been impacted by an injected object and broken by the impact of the object. By virtue of inclusion of the reinforcement plies 48 centrally disposed within the stator vane 40*a*, this stator vane, though cracked and broken, remains in a single piece. A portion of the stator vane is not completely broken off to be carried inwardly through the engine to create yet further damage.

Importantly, because the inner end of the stator vane is only radially retained by the frictional contact with the associated grommet 56, this inner end is pulled out of and released from hub 38 as a sequence of failure occurrences caused by impact from the foreign object. Because the inner end of the blade 48 is rather readily released from the hub 38 in this failure sequence, the failed blade 40*a* rotates and twists in a down stream direction to relatively minimize air flow blockage through the stator vane assembly, yet the broken stator vane 40*a* is retained in the stator vane assembly 46 by virtue of the intersecurement of the foot thereof to the outer surface of shroud 36 as created by the radial inward compression force being exerted thereon through band 74.

For field repair and overhaul purposes, the present invention offers further advantage. The stator vane assembly 26 may be readily disassembled in the field by reversing the assembly steps noted above. That is, a clamping foot is inserted about the circumference to allow rivets 86 to be removed from one end of strip 82 and thus release strap 76 and permit removal of band 74. One or more damages vanes 40 may then be replaced. In comparison, prior ad stator, vane assemblies, with their weldments, potting, etc., normally require the entire stator vane assembly to be returned to the manufacturer, and a plurality of assembly components are required to be replaced even if only one vane requires replacement.

Various alterations and modifications to the preferred arrangement of the invention will be apparent to those skilled in the art. For example, the assembly method and technique could be utilized with metallic, rather than composite stator vanes. Accordingly, the foregoing detailed description should be considered exemplary in nature and not as limiting to the scope and spirit of the invention as set forth in the appended claims.

Having described the invention with sufficient clarity that those skilled in the art may make and use it, what is claimed is:

1. A composite stator vane for a gas turbine engine comprising a plurality of compression molded, heat cured plies, said plies including a plurality of centrally located internal plies of reinforcement material of unidirectional yarns of para-aramid fibers, a plurality of plies of resin impregnated graphite fiber material on each side of said centrally located plies of reinforcement material, and an external steel wire mesh ply on the leading edges of said vanes.

2. A composite stator vane as set forth in claim 1, wherein said plies of para-aramid fibers are disposed with the same orientation of yarns.

3. A composite stator vane as set forth in claim 2, wherein each of said plies of para-aramid fibers are non woven.

4. A composite stator vane as set forth in claim 3, wherein a first inner set of said plies of graphite fiber on each side of said centrally located plies of para-aramid fibers are oriented at a first acute angle relative to the orientation of said para-aramid fibers.

5. A composite stator vane as set forth in claim 4, wherein a second outer set of said plies of graphite fiber on each side of said first set are oriented at a second angle greater than said first set.

6. A composite stator vane as set forth in claim 5, wherein said first acute angle is approximately 22 degrees.

7. A composite stator vane as set forth in claim 6, wherein said second angle is approximately 55 degrees.

8. A composite stator vane as set forth in claim 7, there being seven plies of said centrally located reinforcement material, each of said first sets comprising two plies, and each of said second sets comprising at least two plies.

\* \* \* \* \*